US011491958B2

(12) United States Patent
Tohara

(10) Patent No.: US 11,491,958 B2
(45) Date of Patent: Nov. 8, 2022

(54) BRAKING DEVICE FOR A BICYCLE AND BRAKING SYSTEM FOR A BICYCLE

(71) Applicant: Kenta Tohara, Toyota (JP)

(72) Inventor: Kenta Tohara, Toyota (JP)

(*) Notice: Subject to any disclaimer, the term of this patent is extended or adjusted under 35 U.S.C. 154(b) by 644 days.

(21) Appl. No.: 16/466,147

(22) PCT Filed: Dec. 8, 2017

(86) PCT No.: PCT/JP2017/044133
§ 371 (c)(1),
(2) Date: Jun. 3, 2019

(87) PCT Pub. No.: WO2018/105718
PCT Pub. Date: Jun. 14, 2018

(65) Prior Publication Data
US 2020/0062227 A1   Feb. 27, 2020

(30) Foreign Application Priority Data
Dec. 9, 2016   (JP) .............................. JP2016-239045

(51) Int. Cl.
B60T 8/17   (2006.01)
B60T 7/12   (2006.01)
B60T 7/16   (2006.01)
B62L 3/00   (2006.01)
B62M 6/40   (2010.01)

(52) U.S. Cl.
CPC .............. B60T 8/1706 (2013.01); B60T 7/12 (2013.01); B60T 7/16 (2013.01); B62L 3/00 (2013.01); B60T 2201/02 (2013.01); B60T 2250/00 (2013.01); B60T 2250/04 (2013.01); B60T 2270/60 (2013.01); B62M 6/40 (2013.01)

(58) Field of Classification Search
CPC . B60T 8/1706; B60T 7/12; B60T 7/16; B62L 3/00
USPC .......................................................... 701/70
See application file for complete search history.

(56) References Cited

U.S. PATENT DOCUMENTS

2007/0198160 A1* 8/2007 Sheynblat ........ G08G 1/096791
701/469
2016/0014252 A1* 1/2016 Biderman .............. G08G 1/202
701/29.2

FOREIGN PATENT DOCUMENTS

| JP | 2000-306198 A | 11/2000 |
| JP | 2002297910 A * | 10/2002 |
| JP | 2003-204602 A | 7/2003 |
| JP | 2016-523203 A | 8/2016 |
| WO | 2014/205345 A2 | 12/2014 |
| WO | 2016/185727 A1 | 11/2016 |

* cited by examiner

Primary Examiner — Isaac G Smith
(74) Attorney, Agent, or Firm — Michael Tobias

(57) ABSTRACT

A bicycle braking system includes a server, a portable device such as a smartphone, a display unit, a control unit, a power supply unit, a rotating electrical machine, and a bicycle. The portable device includes an image display unit, a braking condition transmitting unit, and a braking condition setting unit. The control unit regeneratively brakes the bicycle using the rotating electrical machine in accordance with the braking condition set by the braking condition setting unit. The braking system enables a non-user to set braking conditions for the bicycle and to perform braking based on the conditions set by the non-user.

12 Claims, 4 Drawing Sheets

BRAKING DEVICE FOR A BICYCLE AND BRAKING SYSTEM FOR A BICYCLE

TECHNICAL FIELD

This invention relates to a braking device and a braking system for a bicycle.

BACKGROUND ART

Conventionally, a device is known in which a smartphone is attached to a bicycle and in which information about a driving member of the bicycle is displayed on the smartphone (see, for example, Patent Document 1). According to Patent Document 1, the speed of a vehicle and the like are displayed on a smartphone.

PRIOR ART DOCUMENTS

Patent Documents

Patent Document 1: JP 2016-523203 A

DISCLOSURE OF THE INVENTION

Problem to be Solved by the Invention

According to the technology described in Patent Document 1, since the user himself sets various types of bicycle functions on the smartphone screen, the bicycle cannot be braked on the basis of information set by other than the user. It is an object of the present invention to allow other than the user to set the braking condition of the bicycle and to brake the bicycle based on the condition set by other than the user.

Means of Solving the Problem

A bicycle braking device according to the present invention includes a braking unit that brakes a wheel of the bicycle, and a control unit that controls the braking unit based on a braking condition set outside the bicycle. Thus, the braking device for the bicycle can be controlled based on the braking conditions set by other than the bicycle user. For example, a guardian of a bicycle user (such as a young person) can externally set a braking condition and brake the bicycle based on the set braking condition. As a result, it is possible for the bicycle to be operated at a set speed, and it is possible to prevent an accident by a young user.

The braking device for a bicycle includes a communication unit that transmits the traveling state of the bicycle to the outside when the braking unit brakes according to the braking condition, whereby the traveling state of the bicycle when the bicycle is braked according to the braking condition is transmitted to the outside. As a result, for example, a guardian of a young user, an insurance company, or the like can ascertain the situation of the user of the bicycle.

The braking device for a bicycle further includes a position information specifying unit for specifying the position of the bicycle. The braking condition includes the position information of the bicycle, and the control unit brakes the bicycle when the bicycle is in a predetermined position. This enables the bicycle to be braked and reduced to a safe speed when the user enters a predetermined location such as an intersection, a sidewalk, or a dangerous road. As a result, for example, the user's guardian can limit the user's path and speed.

The braking unit is a rotating electrical machine capable of regenerative braking, and the control unit performs regenerative control of the rotating electrical machine. As a result, speed limitation can be performed without hard braking.

A bicycle braking system for braking a bicycle wheel includes a braking unit for braking a bicycle wheel, a braking condition setting unit for setting a braking condition of the bicycle, a control unit for receiving the braking condition and controlling the braking unit, and a communication unit for transmitting a traveling state of the bicycle when braking is performed according to the braking condition to a server. With this structure, it is possible to brake the bicycle based on the braking conditions set by other than the user of the bicycle. As a result, for example, a guardian of a young user of the bicycle can set the braking condition externally and operate the bicycle based thereon. Therefore, the bicycle can be operated at a safe speed to prevent an accident. Furthermore, since the traveling state of the bicycle when braking is performed according to the braking condition is transmitted to the server, it is possible to accumulate in the server information on locations where an accident is likely to occur, such as locations where the speed of the bicycle is likely to become high. As a result, information can be used for accident prevention and calculation of an insurance rate.

Effects of the Invention

According to the present invention, a bicycle can be braked based on conditions set by other than the user.

MODES FOR CARRYING OUT THE INVENTION

Embodiments will be described below with reference to the drawings.

Figure 1:
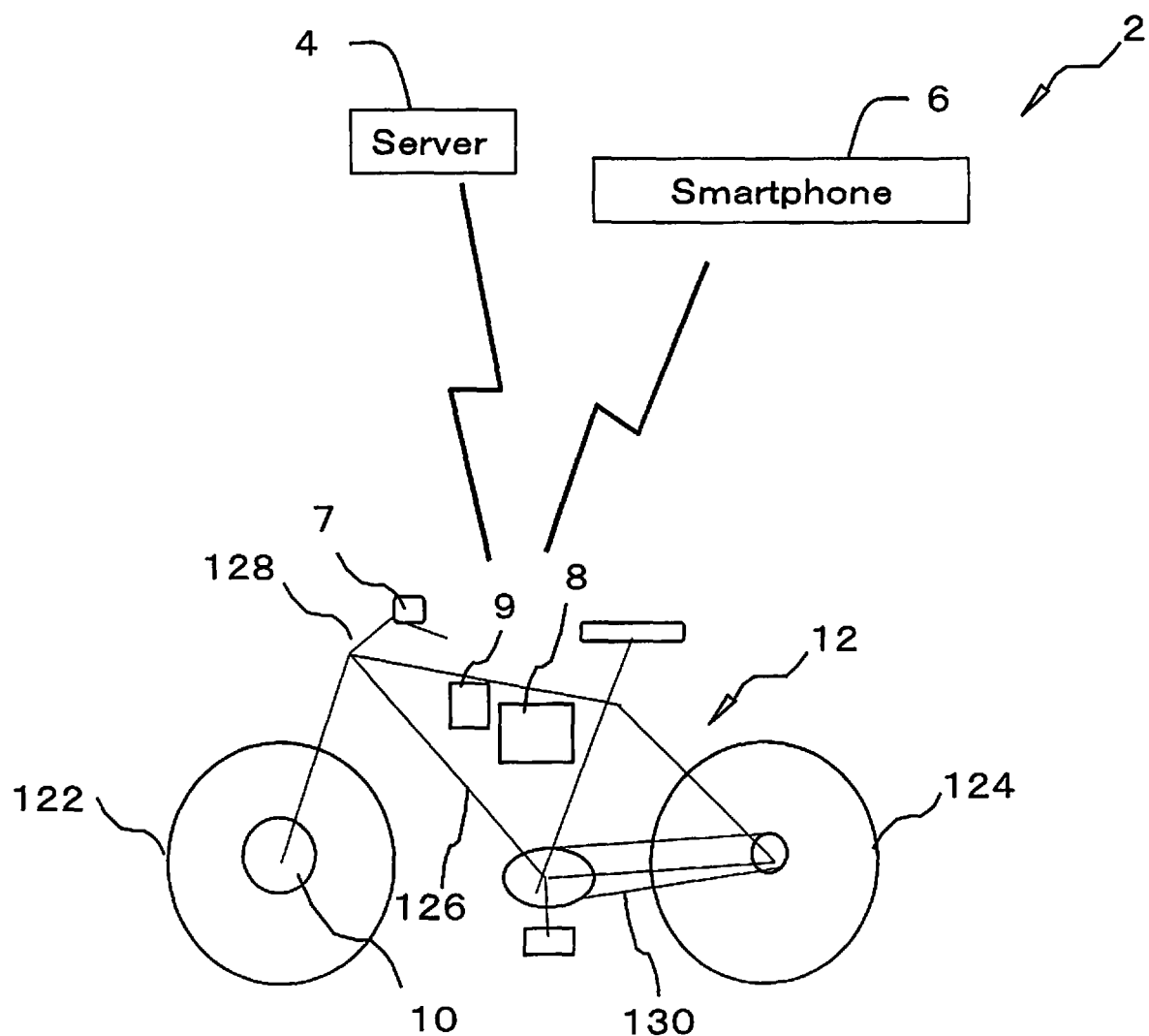
FIG. 1 is a diagram of a braking system for a bicycle according to the present invention.

As shown in FIG. 1, a bicycle braking system 2 includes a server 4, a portable device 6, a display unit 7, a control unit 8, a power supply unit 9, a rotating electrical machine 10, and a bicycle 12.

The server 4 functionally includes an information receiving unit 42. The server 4 can be configured by any of hardware, a DSP (Digital Signal Processor), and software. For example, when the server 4 is configured by software, the information receiving unit 42 is configured to include a CPU, a RAM, and a ROM. The information receiving unit 42 is realized by operating a program which is stored in a recording medium such as a RAM, a ROM, a hard disk, or a semiconductor memory.

Figure 2:
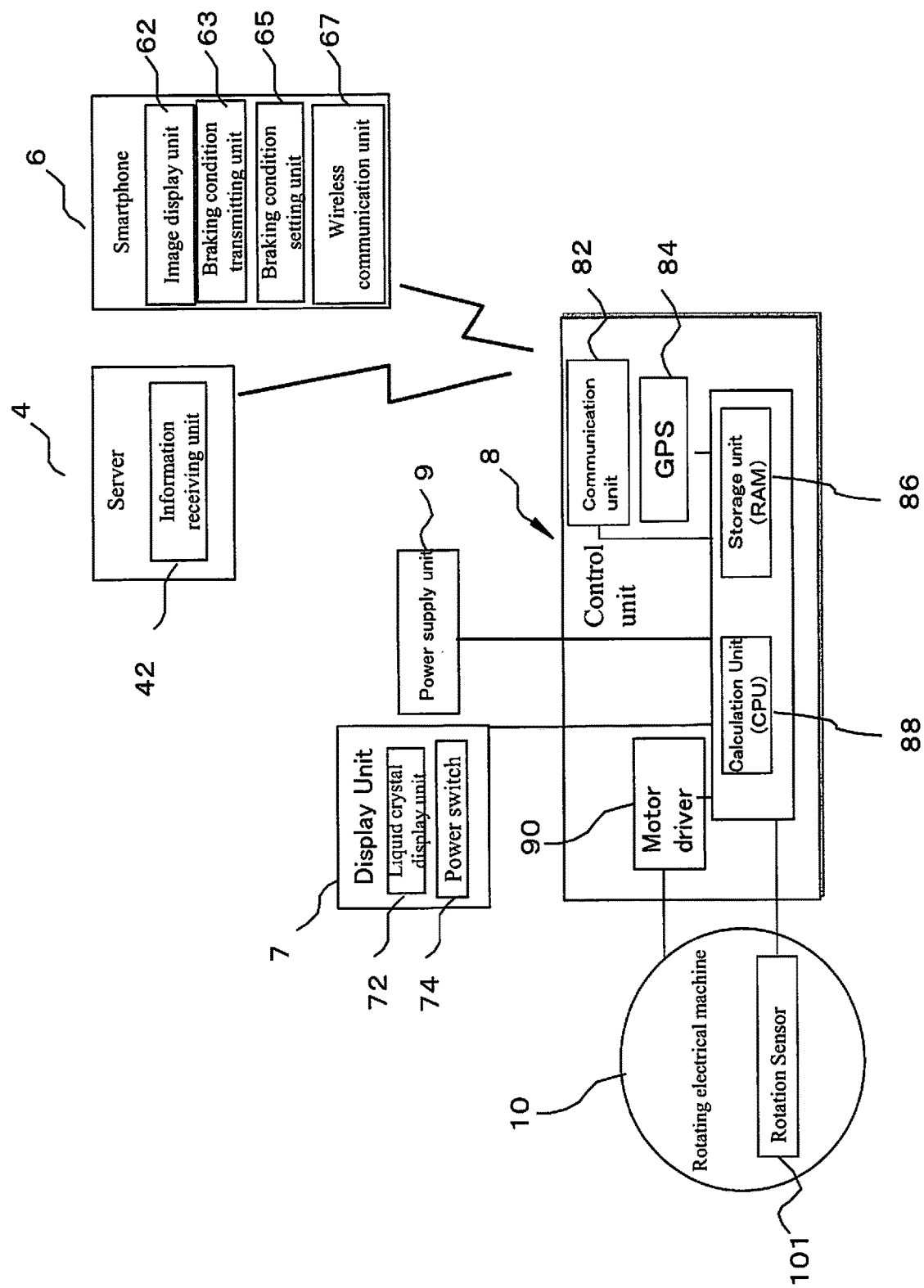
FIG. 2 is a block diagram showing the configuration of the control device.

As shown in FIG. 2, the portable device 6 includes an image display unit 62, a braking condition transmitting unit 63, a braking condition setting unit 65, and a wireless communication unit 67. The portable device 6 includes a microcomputer including a CPU, a RAM, a ROM, an I/O interface and a GPS (Global Positioning System), and a wireless communication device such as a 3G or Bluetooth device (registered trademark). It controls each part by software. The portable device 6 is, for example, a smartphone, a tablet terminal, a wearable terminal, or the like. In the present embodiment, the portable device 6 is a smartphone and is assumed to be possessed by a third party such as a guardian of the user of the bicycle 12.

Figure 3:
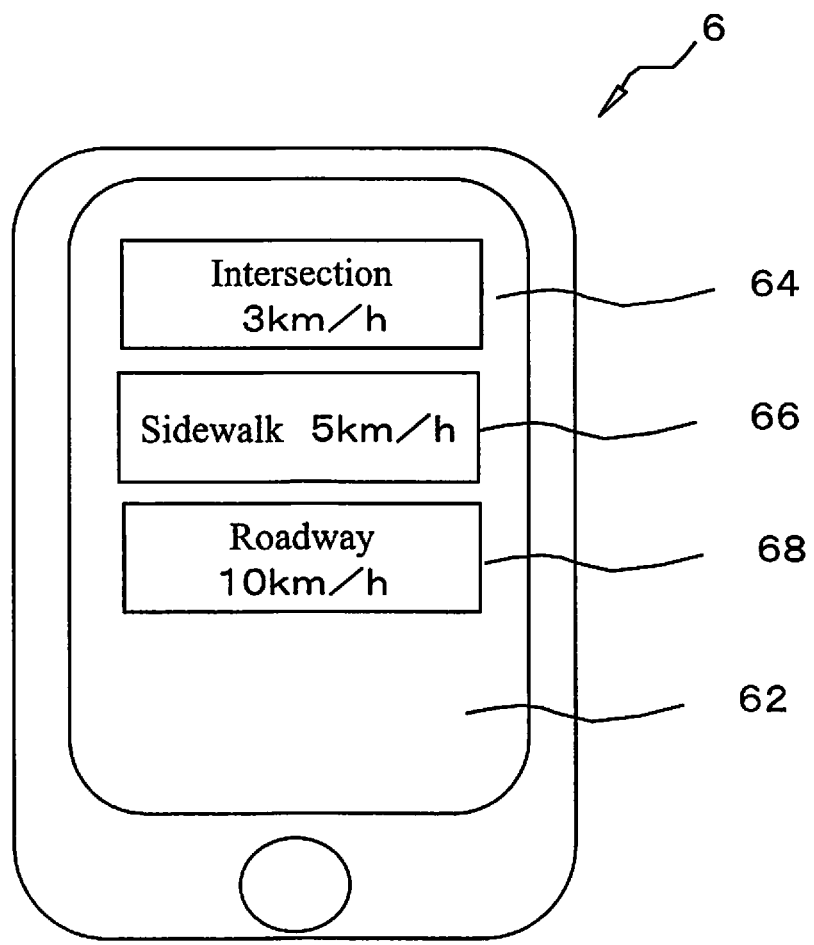
FIG. 3 is a diagram of the display state of a portable device.

As shown in FIG. 3, an application according to this embodiment of the present invention is stored in the ROM of the portable device 6. When the application is started, a screen on which a braking condition to be applied to the bicycle 12 can be entered is displayed on the image display unit 62. According to this embodiment of the present invention, for example, an icon 64 meaning that "the speed of the bicycle 12 will be limited to 3 km/h or less in the vicinity of intersections", an icon 66 meaning that "the speed of the bicycle 12 will be limited to 5 km/h or less on sidewalks", and an icon 68 meaning that "the speed of the bicycle 12 will be limited to 10 km/h or less on roadways" are displayed. When the user's guardian touches one of the icons, the braking condition is recorded in the braking condition setting unit 65 (see FIG. 2) and is transmitted from the braking condition transmitting unit 63 (see FIG. 2) to the control unit 8 via the wireless communication unit 67.

As shown in FIG. 1, the bicycle 12 includes a front wheel 122, a rear wheel 124, a frame 126, a handlebar 128, and a drive mechanism 130. The bicycle 12 is an ordinary bicycle, so a description thereof will be omitted.

As shown in FIG. 1, the display unit 7 is removably provided on the handlebar 128. As shown in FIG. 2, the display unit 7 includes a liquid crystal display unit 72 and a power switch 74. The liquid crystal display unit 72 displays, for example, the speed of the bicycle 12. When the power switch 74 is pressed, the control unit 8 is activated.

As shown in FIG. 1, the control unit 8 is attached to the bicycle frame 126. As shown in FIG. 2, the control unit 8 includes a communication unit 82, a GPS (Global Positioning System) 84 which is a position information specifying unit, a storage unit 86, a calculation unit 88, and a motor driver 90. The control unit 8 includes a microcomputer including CPUs, RAMs, ROMs, and I/O interfaces, and wireless communication devices such as a 3G or Bluetooth device. It controls the respective units by software. The control unit 8 is electrically connected to the display unit 7, the power supply unit 9, a rotating electrical machine 10 which will be described below, and a rotation sensor 101 attached to the rotating electrical machine 10.

As shown in FIG. 2, when the communication unit 82 receives a braking condition from the braking condition transmitting unit 63, the communication unit 82 stores the braking condition in the storage unit 86. In addition, the position and speed of the bicycle 12 when braking is started by the rotating electrical machine 10 are acquired from the calculation unit 88 and the position information specifying unit 84 and are transmitted to the server 4. The position information specifying unit 84 specifies the position of the bicycle 12, and collates information such as "intersection", "walkway", and "roadway" included in the braking condition with the map data stored in the storage unit 86. The calculation unit 88 receives the result of collation from the position information specifying unit 84, calculates an appropriate rotational speed of the rotating electrical machine 10, converts the rotational speed to a control signal, and transmits the control signal to the motor driver 90. The motor driver 90 controls the rotating electrical machine 10 at the speed calculated by the calculation unit 88. Namely, when the speed of the bicycle 12 is faster than the braking condition transmitted from the braking condition transmitting unit 63, the calculation unit 88 calculates the speed to which to decelerate in accordance with the braking condition and transmits the calculated speed, which is converted into a control signal, to the motor driver 90. The motor driver 90 regenerates and brakes the rotating electrical machine 10 to decelerate the rotational speed.

As shown in FIG. 1, the power supply unit 9 is detachably attached to the frame 126. The power supply unit 9 includes one or a plurality of battery cells (not shown). The power supply unit 9 is a secondary battery such as a lithium ion battery. As shown in FIG. 2, the power supply unit 9 is electrically connected to the rotating electrical machine 10 via the motor driver 90 and stores electric power generated by regeneration of the rotating electrical machine 10.

As shown in FIG. 1, the rotating electrical machine 10 (braking unit) is an in-wheel motor having a brushless DC motor (not shown) provided on a shaft portion of the front wheel 122. As shown in FIG. 3, the rotating electrical machine 10 includes a rotation sensor 101. The rotation sensor 101 is a Hall sensor composed of a Hall element. The rotation sensor 101 transmits the rotational speed of the rotating electrical machine 10 to the calculation unit 88 via the motor driver 90. The calculation unit 88 calculates the speed of the bicycle 12 from the rotational speed of the rotating electrical machine 10 and displays the calculated speed on the display unit 7. The rotating electrical machine 10 performs power running or regeneration in response to an instruction from the motor driver 90. Namely, when the speed of the bicycle 12 is higher than the braking condition transmitted from the braking condition transmitting unit 63, the rotating electrical machine 10 performs regeneration to decelerate the rotational speed. Therefore, the rotating electrical machine 10 serves as a braking portion.

Figure 4:
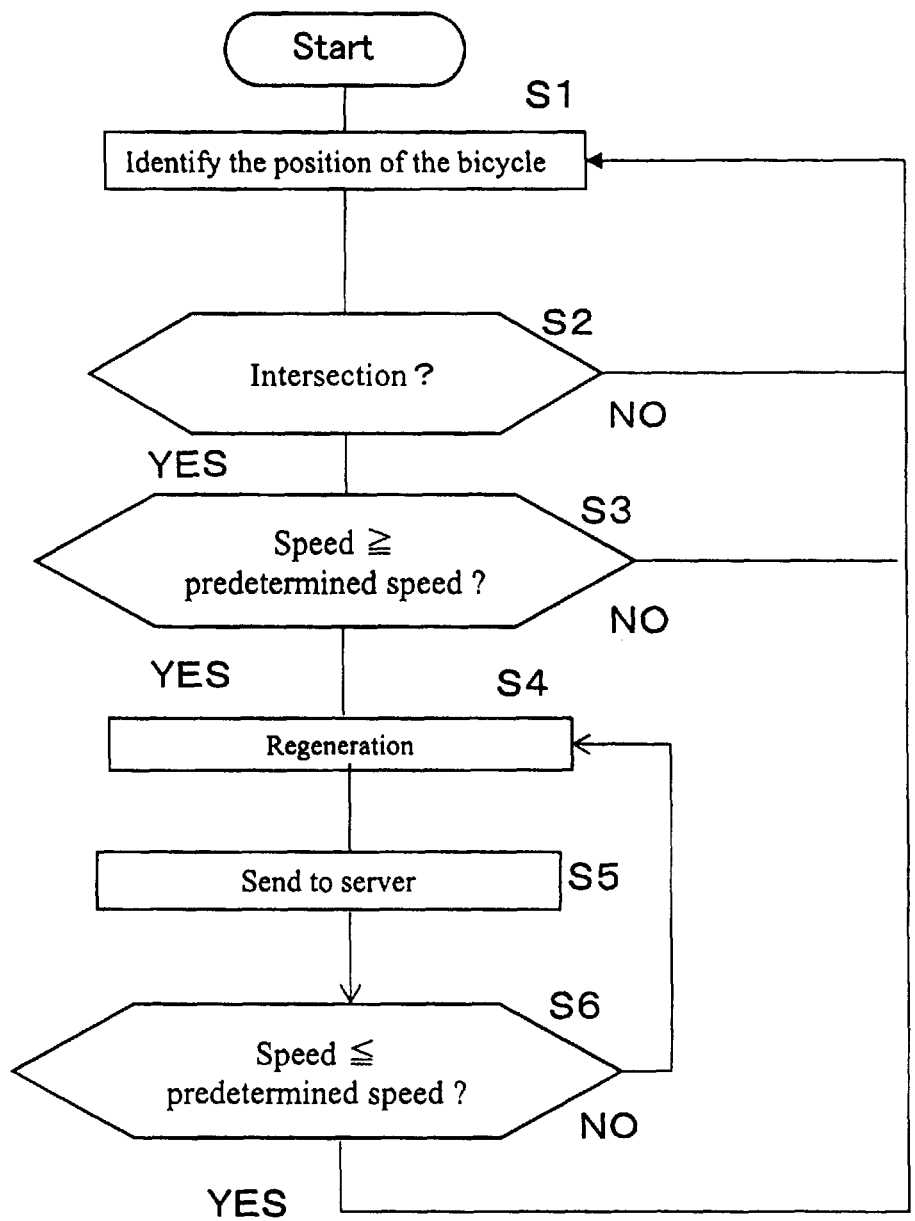
FIG. 4 is a flow chart of the control unit during a braking condition.

Next, an example of the processing performed by the control unit 8 during braking control will be described with reference to FIG. 4. The control unit 8 starts a control operation when the power switch 74 is pressed. Here, the situation will be described in which the braking condition setting unit 65 sets the condition that "the speed of the bicycle 12 will be limited to 3 km/h or less in the vicinity of intersections".

In step S1, the position information specifying unit 84 in the control unit 8 identifies the position of the bicycle 12 based on the condition set by the braking condition setting unit 65 and collates the position with the map information stored in the storage unit 86.

In step S2, the control unit 8 judges whether the bicycle 12 is in the vicinity of an intersection by collating with the map. When the bicycle 12 is in the vicinity of an intersection (S2=YES), the control unit 8 proceeds from step S2 to step S3. When the bicycle 12 is not in the vicinity of an intersection (S2=NO), the control unit 8 proceeds from step S2 to step S1.

In step S3, the control unit 8 judges whether the speed of the bicycle 12 is equal to or higher than the speed set by the braking condition setting unit 65. In the present embodiment, since the predetermined value is 3 km/h, if the speed of the bicycle 12 is 3 km/h or more (S3=YES), the control unit 8 proceeds from step S3 to step S4. On the other hand, if the speed of the bicycle 12 is lower than 3 km/h (S3=NO), the control unit 8 proceeds to step S1.

In step S4, in order to brake the rotating electrical machine 10 regeneratively, the control unit 8 transmits the rotational speed of the rotating electrical machine 10 to the motor driver 90 by converting the rotational speed of the rotating electrical machine 10 to a control signal. In step S5, the control unit 8 transmits the speed and position of the bicycle 12 to the server 4 via the communication unit 82 and proceeds to step S6.

In step S6, as a result of braking the rotating electrical machine 10 regeneratively, if the speed of the bicycle 12 has become equal to or lower than a predetermined value (S6=YES), the control unit 8 proceeds to step S1. In the present embodiment, when the speed of the bicycle 12 has become 3 km/h or less, the control unit 8 proceeds to step S1. On the other hand, if the speed of the bicycle 12 is higher than the predetermined speed in step S6 (S6=NO), the control unit 8 repeats the process of step S4 to continue regenerative braking. In the present embodiment, when the speed of the bicycle 12 is higher than 3 km/h, the control unit 8 repeats the process of step S4 to continue regenerative braking.

In the case where the braking condition setting unit 65 is set to "the speed of the bicycle 12 will be limited to 5 km/h or less on sidewalks" or "the speed of the bicycle 12 will be limited to 10 km/h or less on roadways", the process proceeds in the same manner as in the above-described steps.

In this manner, since the control unit 8 controls the rotating electrical machine 10 based on the braking condition set by the portable device 6, for example, the guardian of the user of the bicycle 12 can operate the bicycle 12 under the braking condition set by the portable device 6. Thus, for example, the speed of the bicycle 12 at intersections can be automatically reduced. As a result, for example, the guardian of the user of the bicycle, such as a young person, can set the braking condition and operate the bicycle based on the braking condition. Therefore, it is possible to prevent an accident by operating the bicycle at a safe speed.

When regenerative braking occurs in the rotating electrical machine 10 based on the braking condition, the control unit 8 sends information concerning the speed and the position of the bicycle 12 to the server 4. As a result, information such as a place where the speed of the bicycle 12 is too high is accumulated in the information receiving unit of the server 4. As a result, data for ascertaining dangerous points such as intersections, sidewalks, and roadways can be accumulated. The data can also be used to calculate an insurance premium rate for a bicycle when, for example, the server 4 is a server of an insurance company.

Furthermore, since the rotating electrical machine 10 is used as the braking unit, the motor driver 90 can control rapid braking such that the front wheel 122 does not lock. As a result, it is possible to prevent the user from falling.

Other Embodiments (a) In the above embodiment, "intersections", "sidewalks", and "roadways" were given as examples, but the present invention is not limited to this mode, and various modifications can be made without departing from the gist of the invention. In particular, a plurality of embodiments and variations described in this specification can be freely combined as necessary.

(b) In the above embodiment, the rotating electrical machine 10 is used as a braking unit, but a hydraulic disc brake, for example, may be used. In this case, the hydraulic pressure which is supplied to the braking unit is controlled by the control unit.

(c) In the above embodiment, the speed of the bicycle 12 is displayed on the display unit 72, but the present invention is not limited to this mode, and, for example, the fact that braking is taking place according to the braking condition may be displayed.

(d) In the above embodiment, the storage unit 86 and the calculation unit 88 are provided in the control unit 8, but the storage unit 86 and the calculation unit 88 may be provided in the server 4. Namely, in the above embodiment, the control unit 8 performs the processes from collation with the map information to conversion into a control signal, but these processes may be performed by the server 4. In order to perform the processes from collation with the map information to conversion into a control signal on the server 4, the braking condition is transmitted from the portable device 6 to the server 4, the position information of the bicycle 12 is transmitted from the control unit 8 to the server 4, and the control signal is transmitted from the server 4 to the control unit 8. This makes it possible to reduce the weight of the control unit 8.

EXPLANATION OF REFERENCE NUMERALS

2: Bicycle braking system
4: Server
8: Control unit
10: Rotating electrical machine
12: Bicycle
65: Braking condition setting unit
82: Communication unit
84: Position information specifying unit

The invention claimed is:

1. A braking system for enabling a parent or guardian to control the speed of a bicycle being ridden by a child, comprising:
 a portable device including an image display unit which displays a plurality of braking conditions for selection by a user of the portable device to be applied to a bicycle, the portable device not being located on the bicycle and being operable by the user of the portable device to select one or more of the displayed braking conditions, a braking condition setting unit which stores the one or more braking conditions selected by the user of the portable device, and a wireless communication unit for wireless transmission of the one or more selected braking conditions stored in the braking condition setting unit to outside of the portable device,
 each displayed braking condition specifying a type of physical location on which the bicycle can travel and a speed limit associated with the type of physical location,
 the plurality of displayed braking conditions including a braking condition for sidewalks and a braking condition for intersections,
 the braking condition for sidewalks specifying a speed limit for when the bicycle is on a sidewalk and the braking condition for intersections specifying a speed limit for when the bicycle is at an intersection;
 a control unit mounted on the bicycle and including a wireless communication unit for receiving the one or more braking conditions transmitted from the portable device, a storage unit containing map data, a position information specifying unit which specifies the current location of the bicycle and collates the current location of the bicycle with the map data in the storage unit to determine if one of the one or more braking conditions transmitted from the portable device is a corresponding braking condition which specifies a type of location corresponding to the current location of the bicycle, and a calculation unit which calculates the current speed of the bicycle and determines if the current speed exceeds the speed limit specified by the corresponding braking condition determined by the position information specifying unit; and a braking unit mounted on the bicycle for braking the bicycle, the control unit controlling the braking unit to brake the bicycle when the calculation unit determines that the current speed of the bicycle exceeds the speed limit specified by the corresponding braking condition determined by the position information specifying unit until the bicycle speed no longer exceeds the speed limit specified by the corresponding braking condition.

2. The braking system as claimed in claim 1 wherein the plurality of displayed braking conditions for selection by the user of the portable device include a braking condition for roadways which specifies a single speed limit for the bicycle when the bicycle is on any roadway.

3. The braking system as claimed in claim 1 wherein the braking condition for sidewalks specifies a speed limit which is the same for every sidewalk, and the braking condition for intersections specifies a speed limit which is the same for every intersection.

4. The braking system as claimed in claim 1, wherein the braking unit comprises a rotating electrical machine which performs regenerative braking, and the control unit performs regenerative control of the rotating electrical machine.

5. The braking system as claimed in claim 1, wherein the braking unit comprises a hydraulic disk brake.

6. The braking system as claimed in claim 1, further comprising a server which is wirelessly connected to the control unit of the braking system, wherein the control unit wirelessly transmits a traveling state of the bicycle to the server when the braking unit is braking the bicycle in accordance with one of the one or more braking conditions transmitted from the portable device to the control unit.

7. A method for remotely controlling the speed of a bicycle comprising:
   displaying on a portable device a plurality of braking conditions for selection by a user of the portable device to be applied to a bicycle, the portable device not being located on the bicycle;
   receiving user input into the portable device of a selection by the user of the portable device of one or more of the displayed braking conditions and wirelessly transmitting the one or more selected braking conditions to outside of the portable device,
   each displayed braking condition specifying a type of physical location on which the bicycle can travel and a speed limit associated with the type of physical location,
   the plurality of displayed braking conditions including a braking condition for sidewalks and a braking condition for intersections,
   the braking condition for sidewalks specifying a speed limit for when the bicycle is on a sidewalk and the braking condition for intersections specifying a speed limit for when the bicycle is at an intersection;
   wirelessly receiving the one or more braking conditions transmitted from the portable device by a control unit on the bicycle, specifying the current location of the bicycle by a position information specifying unit of the control unit and collating the current location of the bicycle with map data stored in a storage unit of the control unit, determining by the position information specifying unit if one of the one or more braking conditions transmitted to the control unit from the portable device is a corresponding braking condition which specifies a type of location corresponding to the current location of the bicycle, calculating the current speed of the bicycle by a calculation unit of the control unit and determining in the control unit if the current speed exceeds the speed limit specified by the corresponding braking condition determined by the position information specifying unit; and
   controlling with the control unit a braking unit mounted on the bicycle to brake the bicycle when the control unit determines that the current speed of the bicycle exceeds the speed limit specified by the corresponding braking condition determined by the position information specifying unit until the bicycle speed no longer exceeds the speed limit specified by the corresponding braking condition.

8. The method as claimed in claim 7 further comprising wirelessly transmitting a traveling state of the bicycle from the control unit to a server when the braking unit is braking the bicycle in accordance with one of the one or more braking conditions transmitted from the portable device to the control unit.

9. A method for remotely controlling the speed of a bicycle comprising:
   wirelessly transmitting one or more braking conditions for a bicycle from a portable device not located on the bicycle to a control unit on the bicycle,
   each braking condition specifying a type of physical location on which the bicycle can travel and a speed limit associated with the type of physical location,
   the one or more braking conditions being selected from a braking condition for sidewalks, a braking condition for intersections, and a braking condition for roadways,
   the braking condition for sidewalks specifying a single speed limit for when the bicycle is on any sidewalk, the braking condition for intersections specifying a single speed limit for when the bicycle is at any intersection, and the braking condition for roadways specifying a single speed limit for when the bicycle is on any roadway;
   wirelessly receiving in the control unit the one or more braking conditions transmitted from the portable device, specifying in the control unit the current location of the bicycle, collating in the control unit the current location of the bicycle with map data stored in the control unit, determining in the control unit if one of the one or more braking conditions transmitted to the control unit from the portable device is a corresponding braking condition which specifies a type of location corresponding to the current location of the bicycle, calculating in the control unit the current speed of the bicycle and determining in the control unit if the current speed exceeds the speed limit specified by the corresponding braking condition determined by the control unit; and
   controlling with the control unit a braking unit mounted on the bicycle to brake the bicycle when the control unit determines that the current speed of the bicycle exceeds the speed limit specified by the corresponding braking condition determined by the control unit until the bicycle speed no longer exceeds the speed limit specified by the corresponding braking condition.

10. The method as claimed in claim 9 further comprising wirelessly transmitting a traveling state of the bicycle from the control unit to a server when the braking unit is braking the bicycle in accordance with one of the one or more braking conditions transmitted from the portable device to the control unit.

11. The method as claimed in claim 7 wherein the control unit controls the braking unit to brake the bicycle without locking the wheels of the bicycle.

12. The method as claimed in claim 9 wherein the control unit controls the braking unit to brake the bicycle without locking the wheels of the bicycle.

\* \* \* \* \*